United States Patent [19]

Mehesan, Jr.

[11] 4,295,771
[45] Oct. 20, 1981

[54] PORTABLE LOAD HANDLING APPARATUS

[75] Inventor: Thomas C. Mehesan, Jr., Hospers, Iowa

[73] Assignee: Banner Industries, Inc., Hospers, Iowa

[21] Appl. No.: 68,201

[22] Filed: Aug. 20, 1979

[51] Int. Cl.³ .......................... B60P 3/00; B65G 61/00
[52] U.S. Cl. ........................................ 414/5; 414/705; 414/718; 414/699
[58] Field of Search ................... 414/680, 685, 694, 4, 414/5, 2, 699, 718, 705; 74/491; 91/521, 522, 524, 428, 434

[56] References Cited

U.S. PATENT DOCUMENTS

| 3,087,636 | 4/1963 | Weaver | 414/728 X |
| 3,721,357 | 3/1973 | Williamson | 414/694 |
| 4,042,131 | 8/1977 | Buttke | 414/694 |

FOREIGN PATENT DOCUMENTS

| 669435 | 10/1964 | Italy | 414/4 |
| 847656 | 9/1960 | United Kingdom | 414/694 |

Primary Examiner—Allen N. Knowles
Attorney, Agent, or Firm—Zarley, McKee, Thomte et al.

[57] ABSTRACT

A portable load handling apparatus includes a vehicle having a frame, and an elongated boom arm connected to the frame for pivotal movement about at least a first horizontal axis. The boom arm may pivot about a first vertical axis and be extendable and retractable as well. A load support member is connected to the boom arm by a wrist mechanism for pivotal movement about at least first and second generally perpendicular axes and may be pivotal about a third axis perpendicular to the first and second axes. A primary power source is actuatable to pivot the boom arm about the first horizontal and vertical axes and to extend and retract the boom arm and a secondary power means is actuatable to pivotally move the support member about the first, second and third axes. A control mechanism includes a control arm connected to the frame for pivotal movement about at least a second horizontal axis, with the control arm preferably pivotal about a second vertical axis and extendable and retractable as well. A control handle is connected to the control arm for pivotal movement about at least fourth and fifth perpendicular axes and preferably about a sixth axis as well. The control mechanism further includes apparatus for actuating the primary and secondary power sources such that the boom arm and wrist supported load support member follow or duplicate movements of the control arm and handle respectively.

9 Claims, 14 Drawing Figures

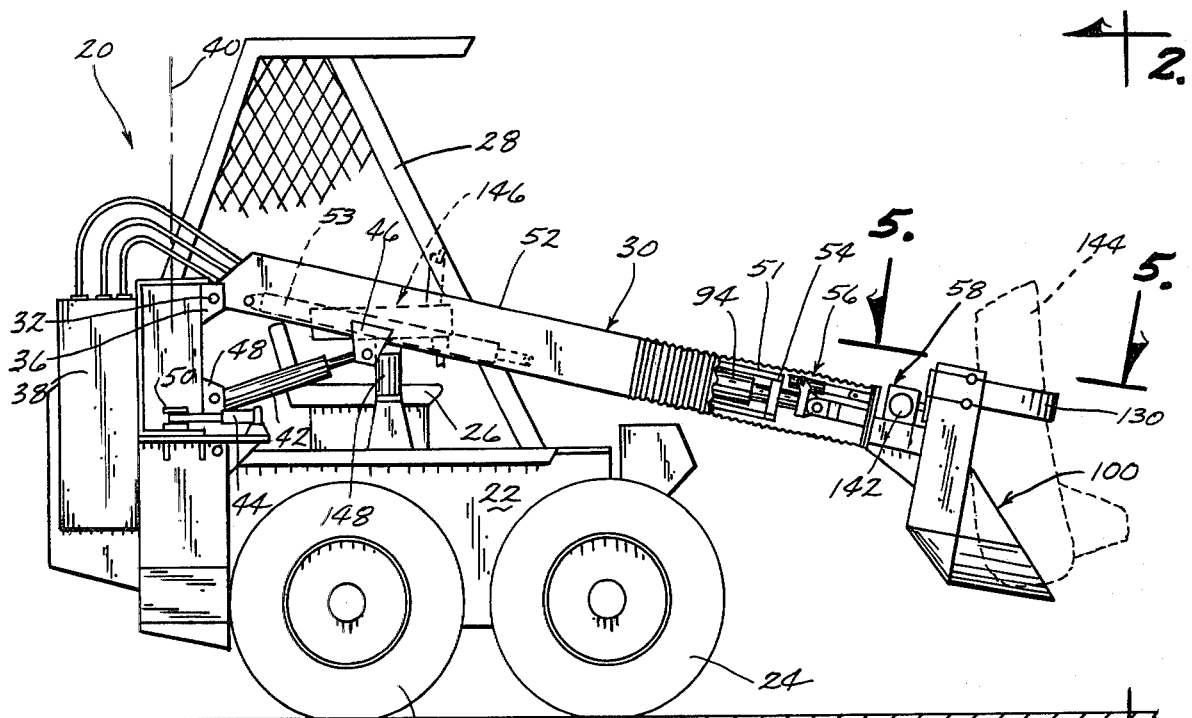
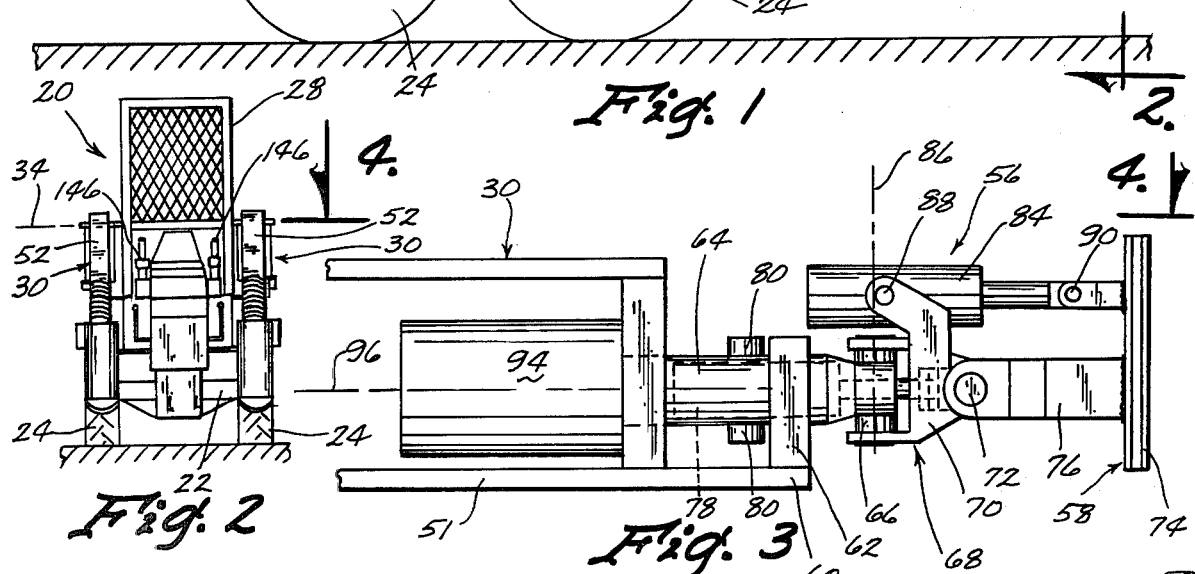
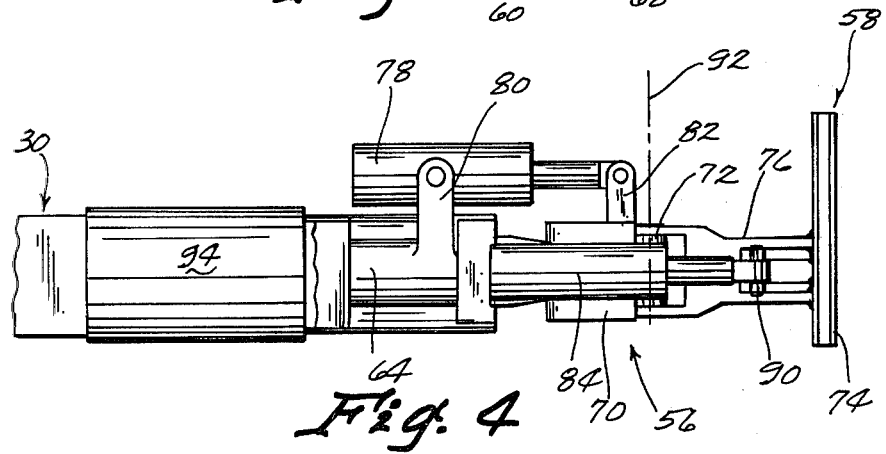

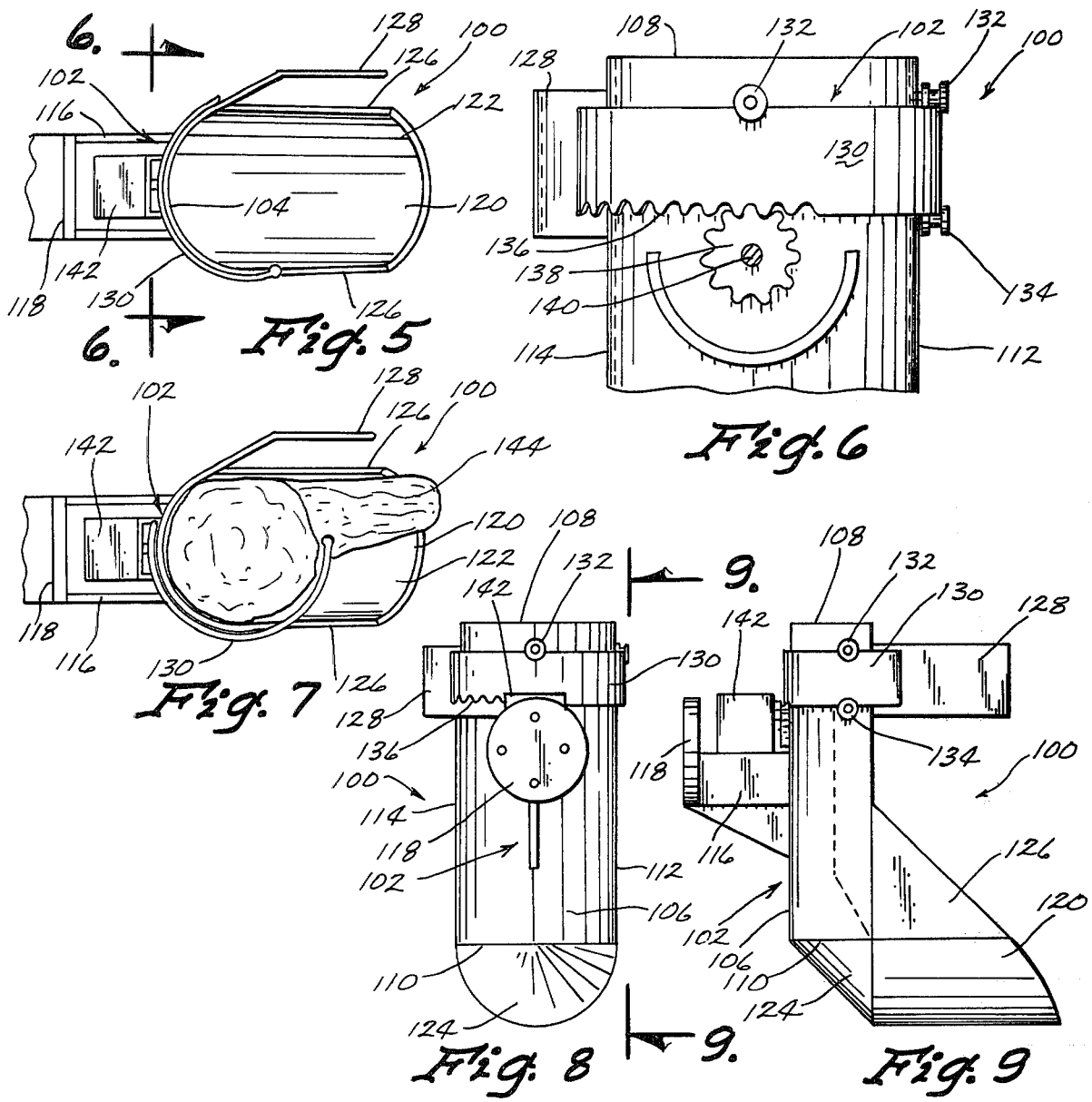

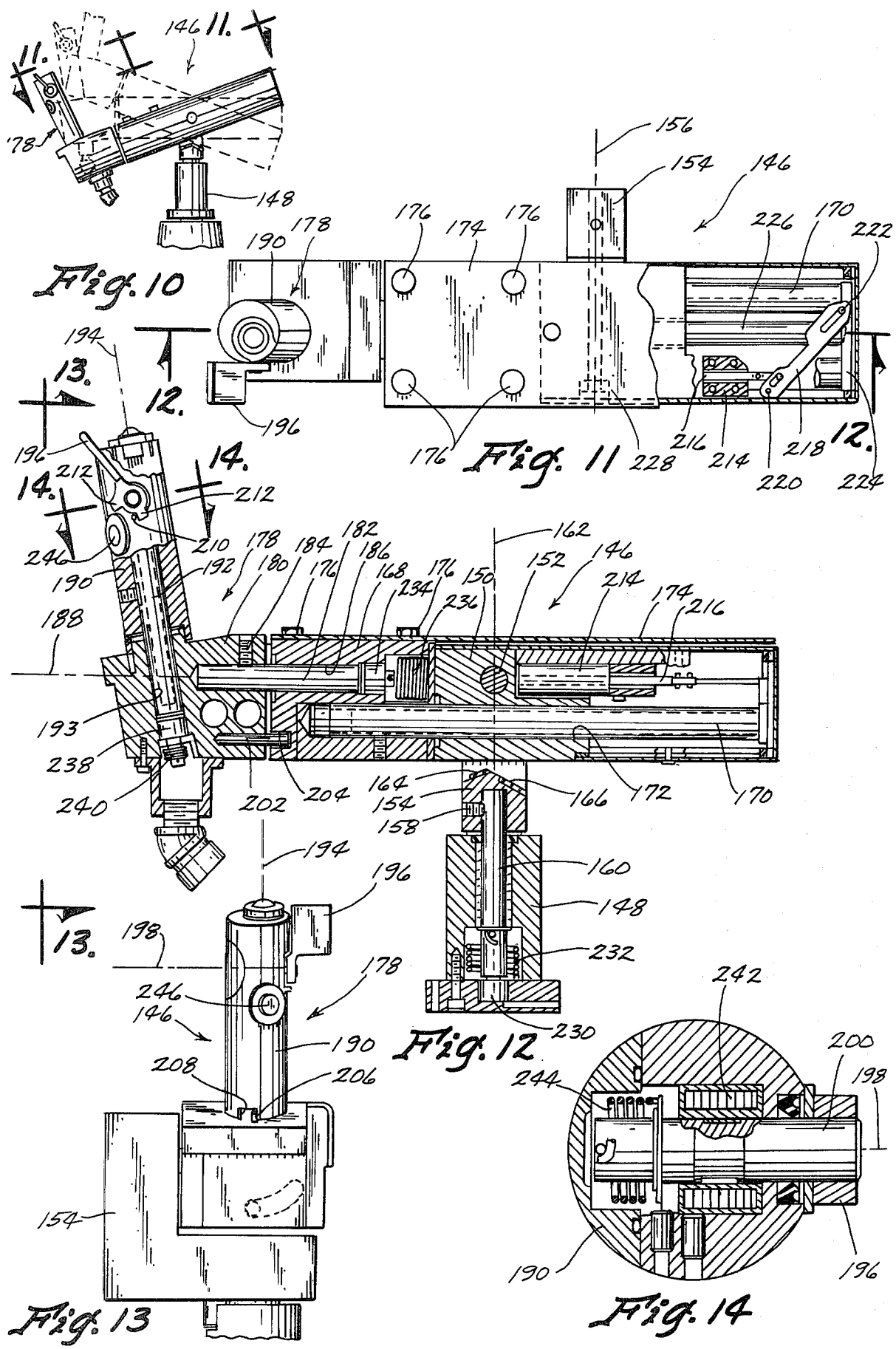

PORTABLE LOAD HANDLING APPARATUS

BACKGROUND OF THE INVENTION

The present invention is directed generally to a portable load handling apparatus and more particularly to a portable apparatus having an elongated boom arm having a load support member connected thereto by a wrist mechanism for maximum freedom of pivotal and linear movement of the load support member relative to the vehicle.

Certain large, heavy and unwieldy loads such as quarters of beef are very difficult to handle with such conventional equipment as a forklift. Typically, it takes one to two months for an operator to become proficient enough to lift beef quarters two at a time in the bucket of a forklift and to tip the lift for unloading the beef quarters into a truck. The problem is largely due to the limited degree of movement of a forklift bucket and the fact that a single bucket is manipulated to handle two different beef quarters. Accordingly, there is a need for an apparatus which can more easily handle such large, heavy and unwieldy loads.

Accordingly, a primary object of the invention is to provide an improved load handling apparatus.

A further object is to provide a load handling apparatus having a boom arm which is provided with a load support member connected thereto by a wrist mechanism for increased freedom of pivotal movement.

A further object of the invention is to provide such a load handling apparatus wherein the boom arm is supported for pivotal movement about both horizontal and vertical axes.

A further object of the invention is to provide a load handling apparatus wherein the boom arm is extendable and retractable as well.

Another object is to provide a load handling apparatus wherein the wrist mechanism provides for pivotal movement of the load support member about at least a pair of perpendicular axes.

A related object of the invention is to provide a load handling apparatus wherein the wrist mechanism provides for pivotal movement about three generally perpendicularly related axes.

A further object of the invention is to provide such a load handling apparatus wherein movements of the boom arm and wrist supported load support member duplicate or reproduce the movements of a manually operated control arm and control handle respectively.

A further object is to provide a load handling apparatus having a pair of such boom arms independently operated and controlled by independent control arms.

A further object is to maximize the freedom of movement of the load support member relative to the portable apparatus on which it is mounted.

Finally, an object is to provide a load handling apparatus which is durable in use and efficient in operation.

SUMMARY OF THE INVENTION

The load handling apparatus of the present invention includes a portable vehicle including at least one elongated boom arm mounted thereon for pivotal movement about both horizontal and vertical axes. The boom arm may be extensible and retractable as well. A load support member is connected to the free end of the boom arm by a wrist mechanism which provides freedom of pivotal movement about at least two perpendicular axes relative to the boom arm. The wrist mechanism may further provide for pivotal movement of the load support member about a third perpendicular axis. A primary power means moves the boom arm relative to the vehicle frame and a secondary power means moves the load support member relative to the boom arm. To control the movement of the boom arm and the load support member, a similarly supported but smaller control arm is provided having a handle pivotally connected thereto much like the connection of the load support member to the boom arm. The control arm assembly is operatively connected to the primary and secondary power means such that the boom arm and load support member follow or reproduce the movements of the control arm and handle respectively. Accordingly, an operator need only manually move the control arm and handle to easily move the boom arm and its wrist supported load support member in much the same manner as a human arm. The load handling apparatus is particularly adapted for handling large heavy and unwieldy loads such as quarters of beef and the independent actuation of a pair of boom arms enables the simultaneous handling of two beef quarters, for example, independently of one another.

BRIEF DESCRIPTION OF THE DRAWINGS

FIG. 1 is a side elevational view of a load handling apparatus of the invention;

FIG. 2 is a reduced front view of the load handling apparatus, as seen on line 2—2 in FIG. 1;

FIG. 3 is an enlarged, partially fragmented side detail view of the wrist mechanism of the invention;

FIG. 4 is a top view of the wrist mechanism as seen on line 4—4 in FIG. 3;

FIG. 5 is a top view of the boom mounted carrier, as seen on line 5—5 in FIG. 1;

FIG. 6 is an enlarged rear partially sectional and fragmented view of the carrier as seen on line 6—6 in FIG. 5;

FIG. 7 is a top view of the carrier, similar to FIG. 5, showing a beef quarter supported thereon;

FIG. 8 is a rear elevational view of the carrier;

FIG. 9 is a side elevational view of the carrier as taken along line 9—9 in FIG. 8;

FIG. 10 is a side elevational view of the control arm of the invention;

FIG. 11 is an enlarged plan view of the control arm taken along line 11—11 in FIG. 10 with portions broken away for clarity;

FIG. 12 is a side sectional view of the control arm assembly as taken along line 12—12 in FIG. 11;

FIG. 13 is a front end view of the control arm assembly as seen on line 13—13 in FIG. 12; and FIG. 14 is an enlarged detail sectional view of the control arm handle taken along line 14—14 in FIG. 12.

DESCRIPTION OF THE PREFERRED EMBODIMENT

The load handling apparatus of the present invention, indicated generally at 20 in FIG. 1, includes a movable vehicle having a frame 22 supported on front and rear ground wheels 24. The apparatus is preferably self-propelled and includes an operator's seat 26 situated within a screened protective cage structure 28. The basic vehicle as thus far described is conventional and may be constructed as a modification of such commercially available units as the Melroe 310 Bobcat, for example. Such modification would preferably include foot pedal steering controls in order to free the operator's hands for use as described hereinbelow.

Referring to FIGS. 1 and 2, an elongated boom arm 30 is supported at one end by a pivot pin 32 for pivotal movement about a first horizontal axis 34. It can be seen in FIG. 2 that a pair of identical boom arms 30 are mounted on opposite sides of the vehicle frame 22. Accordingly, like reference numerals will be used to describe like parts of each with the understanding that a pair of axes referred to by the same reference numeral are not necessarily aligned, parallel or otherwise related. Pivot pin 32 rotates within a bracket 36 of an upstanding collar 38 which pivots about a first vertical axis 40 on an upstanding frame post (not shown). The boom arm is operated by a primary power means including an extensible and retractable hydraulic cylinder unit 42 for raising and lowering the boom arm 30 and a second hydraulic cylinder unit 44 for transverse pivotal movement of the boom arm 30 about the vertical axis 40. Hydraulic cylinder 42 is pivotally connected between a depending bracket 46 on boom arm 30 and a forwardly extending bracket 48 which is secured to a lower portion of sleeve 38 in vertical alignment with bracket 36. Hydraulic cylinder 44 is pivotally connected at one end to frame 22 and at the other end to a bracket 50 mounted on the side of sleeve 38 whereby the sleeve is rotated in response to extension and retraction of hydraulic cylinder 44. The boom arm 30 itself is of telescopic construction and may be extended and retracted by operation of an internally mounted hydraulic cylinder unit 53. Accordingly, the free end 54 of boom arm 30 may be linearly extended and retracted, as well as pivoted about the first horizontal axis 34 and first vertical axis 40. Boom arm 30 includes inner and outer boom sections 51 and 52.

A wrist mechanism 56 connects a load support member 58 to the free end 54 of boom arm 30 with freedom of pivotal movement much like the freedom of movement of a person's hand relative to his forearm. Referring to FIGS. 3 and 4, the inner boom section 51 includes a lower extension 60 having an upstanding bearing block 62 thereon which supports an elongated shaft 64, the forward end of which is connected to a pin 66 of a universal joint 68. The universal joint includes a yoke 70 pivotally supported on pin 66 and adapted to carry a second pin 72 which is disposed perpendicular to pin 66. The load support member 58 includes a generally flat mounting plate 74 rigidly connected to a rearwardly extended yoke 76 which is pivotally supported on pin 72.

A secondary power source for pivotally moving the load support member 58 relative to the boom arm 30 includes an hydraulic cylinder unit 78 pivotally connecting a pair of ears 80 on shaft 64 and a pair of ears 82 on the universal joint yoke 70 for pivotally moving mounting plate 74 about a first axis 86, that of pin 66. Another hydraulic cylinder unit 84 is pivotally interconnected between the universal joint yoke 70 and mounting plate 74 by pins 88 and 90 for pivotal movement of mounting plate 74 about a second axis 92 which is disposed perpendicular to the first axis 86. In addition, the shaft 64 is operatively connected to the output shaft of a hydraulic actuator 94 for rotation of mounting plate 74 about a third axis 96 disposed perpendicular to both the first axis 86 and second axis 92 and generally aligned with the longitudinal center line of boom arm 30.

Referring to FIG. 5, a carrier 100 is mounted on plate 74 for advantageously handling beef quarters and the like. For purposes of describing the carrier, the term boom arm shall be considered to include the extensible member 30, the wrist mechanism 56 and the mounting plate 74.

Carrier 100 includes an upstanding rear wall structure 102 having a forward surface 104, a rearward surface 106, upper and lower ends 108 and 110 respectively and opposite sides 112 and 114. Wall structure 102 is arcuate in top cross section, having a concave forward surface 104 and convex rearward surface 106. A mounting structure 116 is secured to and extended rearwardly from a central position on the rear wall structure for securement of an upstanding plate portion 118 thereof to mounting plate 74 by bolts or other suitable means. A load support platform 120, also arcuately shaped to present a concave upper surface 122 is connected to the rear wall structure 102 adjacent the lower end 110 thereof and extended forwardly therefrom. An arcuate closure plate 124 interconnects the rear wall structure 102 and platform 120 as do a pair of gusset plates 126. A side member 128, which may be formed integrally with rear wall structure 102, extends forwardly from the side 114 of wall structure 102 to laterally support a load carried on platform 120. Finally, an arcuate gate 130 is circumferentially engaged about the wall structure 102 and movably supported thereon by upper and lower guide rollers 132 and 134. A rearward portion of gate 130 is provided with a rack 136 of teeth along the lower edge thereof which are adapted for engagement with a pinion gear 138 rotatably supported adjacent wall structure 102 on the output shaft 140 of an electric motor 142. Accordingly, upon actuation of motor 142, gate 130 is circumferentially advanced relative to wall structure 102 between the loading position of FIG. 5 and the carrying position of FIG. 7. In the loading position, gate 130 is laterally or circumferentially displaced from the forward surface 104 of wall structure 102 so that a beef quarter 144 or like load may be received onto platform 120 in leaning engagement against forward surface 104. In the carrying position, gate 130 is extended forwardly of and laterally across the forward surface 104 of wall structure 102 to thereby at least partially enclose the beef quarter 144 between the side member 128, wall structure 102 and gate 130. Because of the arcuate shape of platform 120, carrier 100 is readily adaptable to scoop up a beef quarter in shovel-like fashion when the wall structure 102 is disposed at various inclinations relative to vertical. Accordingly, the carrier may be advanced by the boom arm at whatever disposition is required to receive a particular beef quarter whereupon gate 130 may be closed to retain the beef quarter thereon and the entire assembly may be lifted on the boom arm and transported to any desired position or location.

Referring now to FIGS. 10-14, there is shown a manually operated control arm 146 which is rotatably supported on a pedestal 148 located adjacent the operator's seat 26 on the truck frame 22 as seen in FIG. 1. In FIG. 2, it is seen that a pair of independent control arms 146 are supported on opposite sides of seat 26 for independantly controlling the operation of the respective adjacent boom arms 30.

Control arm 146 includes a base member 150 pivotally supported on a transverse shaft 152 of a generally L-shaped support member 154 for pivotal movement of the control arm about a second horizontal axis 156. Support member 154, in turn, is secured by a set screw 158 to a depending shaft 160 which is pivotally received within the pedestal 148 for pivotal movement of the control arm about a second vertical axis 162. Note that the support member 154 is provided with a pair of bearing pads 164 and 166 adapted to engage the underside of base member 150 when the control arm is in the downwardly inclined solid line position of FIG. 10 and upwardly inclined dotted line position respectively. Finally, control arm 146 includes a slide block 168 having a pair of transversely spaced apart rearwardly extended shafts 170 slidably received within longitudinal bores 172 in base member 150 so that the control arm 146 may be extended and retracted in response to longitudinal movement of slide block 168 and shafts 170 relative to base member 150. A cover member 174 is secured to slide block 168 by bolts 176.

A control handle, indicated generally at 178, includes a base member 180 having a pivot shaft 182 secured thereto by a set screw 184 and extended rearwardly therefrom for receipt within a longitudinal bore 186 of slide block 168. Accordingly, control handle 178 is pivotal about a sixth axis 188, that of shaft 182.

A handle member 190 extends upwardly from base member 180 and is pivotally connected thereto by a depending shaft 192 which is pivotally received within an upright bore 193 in the base member 180. Accordingly, handle member 190 is supported for pivotal movement about a fifth axis 194, that of shaft 192. Note that the fifth axis 194 is generally perpendicular to sixth axis 188 although slightly forwardly inclined relative thereto.

Finally, a thumb lever 196 is pivotally secured to handle member 190 for pivotal movement about a fourth axis 198, that of the shaft 200 on which the thumb lever 196 is mounted as shown in FIG. 14.

Pivotal movement of the handle member about each of the fourth, fifth and sixth axes is limited to the extent of desired pivotal movement for the load support member 58 about the first, second and third axes respectively. For example, in FIGS. 12 and 13, a pin 202 in base member 180 cooperates with a slot 204 in slide block 168 to limit pivotal movement about sixth axis 188. In FIG. 13, it is seen that an upstanding pin 206 cooperates with a cut out portion 208 of handle member 190 to limit pivotal movement about fifth axis 194 and a transverse pin 210 on handle member 190 provides a stop for flanges 212 on thumb lever 196 to limit pivotal movement about fourth axis 198.

In order to control movements of the boom arm 30 and load support member 58 by the control arm 146 and control handle 178 it is first necessary to sense the pivoted and linear positions of these members. For this purpose, a control transducer 214, in the form of a linear variable differential transformer (LVDT) is secured to the control arm base member 150 for sensing the relative extension thereof. LVDT 214 has a slidable core 216 which is shown in FIGS. 11 and 12 as connected by a pin and slot connection to a lever 218 having one end pivotally connected to base member 150 by a pin 220 and the opposite end pivotally connected by a pin 222 to a cross member 224 which is longitudinally slidable with shafts 170 and slide block 168. Accordingly, extension of control arm 146 effects a pivotal movement of lever 218 which causes a reduced linear movement of core 216 to vary the signal received from LVDT 214 when an excitation voltage is applied thereto. A compression spring (not shown) is to be fitted onto a central alignment shaft 226 for biassing the control arm to its fully retracted position shown in FIGS. 11 and 12.

Likewise, a second control transducer 228 in the form of a rotational variable differential transformer (RVDT) is operatively connected to horizontal shaft 152 for sensing the pivoted position of the control arm about the second horizontal axis 156. In FIG. 12, a third RVDT 230 is shown connected to the lower end of shaft 160 for sensing the relative pivoted position of the control arm about the second vertical axis 162. A spring 132 is connected to the pedestal 148 and shaft 160 to bias the control arm to a home position directed longitudinally of the vehicle frame 22. A similar fourth RVDT 234 is operatively connected to shaft 182 for sensing the pivoted position of the control handle 178 about sixth axis 188. Spring 236 biases the handle member 190 to an upright home position. A fifth control transducer, an RVDT, is secured to upright handle shaft 192 for sensing the relative pivoted position of the handle member 190 about fifth axis 194 and a spring 240 biases shaft 192 to a centered home position. Finally, a sixth control transducer 242, an RVDT, is operatively connected to the thumb lever shaft 200 for sensing the relative pivoted position of the thumb lever 196 about fourth axis 198 and a spring 244 biases thumb lever 196 to the home position indicated in FIG. 12.

A corresponding set of feedback transducers (not shown) are operatively connected in conventional manner to the boom arm 30 and wrist mechanism 56 for sensing the relative extension of the boom arm, its relative pivoted position about first horizontal axis 34 and first vertical axis 40 and the relative pivoted positions of the load support member 58 about first axis 86, second axis 92 and third axis 96.

The control transducers and feedback transducers are electrically connected to a processor (not shown) which delivers an excitation voltage to each of the transducers for receiving position indicating signals therefrom. The processor is also electrically connected to solenoid actuated control valves for moving each of the hydraulic power units in opposite directions.

In operation, all that the operator need do to handle a beef quarter is to manipulate the control arm 146 and handle 178 to cause the boom arm 30 and load support member 58 to duplicate those movements respectively for manipulation of the carrier assembly much like the action of a human hand. Note that a gripper switch 246 is provided on the handle member 190 for actuating electric motor 142 to move the carrier gate 130 between its loading and carrying positions.

For purposes of the reproduced motion, note that the first horizontal and vertical axes for the boom arm correspond to the second horizontal and vertical axes for the control arm and the relative extension of each member is correspondingly related. Likewise, the first, second and third axes of the wrist mechanism correspond to the fourth, fifth and sixth axes associated with at least portions of the control handle 178.

The control circuitry for the processor may be constructed according to conventional practice from a commercially available bidirectional controller such as that manufactured by Ledex of Dayton, Ohio and disclosed on their drawing number 266 239-001.

Thus a single operator can independently manipulate the carriers 100 on each separate boom arm 30 for quickly and easily grasping and manipulating such unwieldy loads as a beef quarter. Furthermore, the simulated motion control feature enables an operator to become proficient in a minimum of time. Thus there has been shown and described a load handling apparatus and carrier apparatus which accomplish at least all of the stated objects.

While the invention herein has been characterized as a load handling apparatus, it is understood that this invention has applicability to the remote control and handling of a variety of objects where movement thereof and not the lifting and manipulation of a load per se is the primary consideration.

I claim:

1. A load handling apparatus comprising,
   a movable vehicle including a frame,
   an elongated boom arm having opposite end portions,
   means for operatively connecting said boom arm to said frame for pivotal movement about a first generally horizontal axis and a first generally vertical axis,
   primary power means connected to said boom arm and frame for pivotally moving said boom arm about said first horizontal axis and first vertical axis,
   said boom arm being longitudinally extendable and retractable for movement of one end portion toward and away from said first horizontal axis and said primary power means including means for longitudinally extending and retracting said boom arm,
   a load support member,
   wrist means interconnecting said load support member and said one end portion of said boom arm for pivotal movement of said load support member adjacent said one end portion of said boom arm and about first and second axes disposed generally perpendicular to one another and to the longitudinal centerline of said boom arm,
   means for supporting said wrist means on said one end portion of said boom arm for pivotal movement of said wrist means about a third axis disposed generally parallel to the longitudinal centerline of said boom arm,
   secondary power means connected to said wrist means for pivotally moving said load support member about said first and second axes and for pivotally moving said wrist means about said third axis, and
   control means for selectively actuating said primary and secondary power means for movement of at least one of said boom arm and load support member about at least a selected one of said axes, said control means including
   an elongated control arm having opposite ends,
   means for connecting said control arm to said frame for pivotal movement about a second generally horizontal axis and a second generally vertical axis,
   means for extending and retracting said control arm for movement of said one end toward and away from said second horizontal axis,
   means for actuating said primary power means to pivotally move said boom arm about said first horizontal axis and first vertical axis in response to pivotal movement of the control arm about the second horizontal axis and second vertical axis respectively and means for actuating said primary power means to longitudinally extend and retract said boom arm in response to extension and retraction of said control arm such that said boom arm follows the movements of said control arm,
   a control handle operatively connected to said one end of said control arm with freedom of pivotal movement of at least a portion of said handle about fourth and fifth axes disposed generally perpendicular to one another and to the longitudinal centerline of said control arm,
   means for supporting said control handle on said one end of said control arm for pivotal movement of said control handle about a sixth axis disposed generally parallel to the longitudinal centerline of said control arm, and
   means for actuating said secondary power means to pivotally move said load support member about said first and second axes in response to pivotal movement of at least said portion of the control handle about said fourth and fifth axes respectively and to pivotally move said wrist means about said third axis in response to pivotal movement of said control handle about said sixth axis such that said load support member follows the movements of said control handle.

2. The load handling apparatus of claim 1 further comprising a flexible boot enclosing said wrist means, said flexible boot being operatively connected at one end to said boom arm and at the other end to said load support member.

3. The load handling apparatus of claim 1 wherein said control means further comprises
   a plurality of control transducers on said control arm and handle for sensing the pivotal positions thereof about said second horizontal axis and said fourth and fifth axes respectively,
   a plurality of feedback transducers on said boom arm and support member for sensing the pivotal positions thereof about said first horizontal axis and said first and second axes respectively, and
   a processor unit electrically connected to said control transducers and feedback transducers for receiving and comparing signals therefrom.

4. The load handling apparatus of claim 3 wherein said control transducers and said feedback transducers comprise a plurality of rotational variable differential transformers.

5. The load handling apparatus of claim 3 wherein said primary and secondary power means comprise a plurality of hydraulic power units adapted for connection to a source of hydraulic fluid under pressure, said means for actuating said primary and secondary power means comprising a plurality of solenoid actuated valves operatively connected to said respective hydraulic power units for regulating the supply of hydraulic fluid thereto,
   said processor unit being electrically connected to said solenoid actuated valves for operating selected ones of said hydraulic power units to cause said boom arm and load support member to follow the movements of said control arm and handle respectively.

6. The load handling apparatus of claim 3 wherein said control means further comprises a control transducer on said control arm for sensing the relative extension thereof,
   a feedback transducer on said boom arm for sensing the relative extension thereof, said last mentioned control transducer and feedback transducer being electrically connected to said processor unit.

7. The load handling apparatus of claim 6 wherein said last mentioned control transducer and feedback transducer each comprise a linear variable differential transformer.

8. The load handling apparatus of claim 1 wherein said control handle extends upwardly from said one end of the control arm.

9. The load handling apparatus of claim 8 wherein said portion of said control handle comprises a thumb lever supported on said control handle for pivotal movement about said first axis.

* * * * *